(12) United States Patent
Artsiely et al.

(10) Patent No.: US 12,146,593 B2
(45) Date of Patent: Nov. 19, 2024

(54) GROOVED PIPE COUPLING WITH IMPROVED SEALING

(71) Applicant: MODGAL METAL (99) LTD., Rosh Pina (IL)

(72) Inventors: Eyal Artsiely, Moshav Yafit (IL); Yoel Bahalul, M. Kinneret (IL); Meir Ben Harush, Kiryat Shmona (IL); Genia Lubomirski, Carmiel (IL); Gregori Kreimerman, Rosh Pina (IL)

(73) Assignee: MODGAL METAL (99) LTD., Rosh Pina (IL)

( * ) Notice: Subject to any disclaimer, the term of this patent is extended or adjusted under 35 U.S.C. 154(b) by 0 days.

(21) Appl. No.: 18/243,270

(22) Filed: Sep. 7, 2023

(65) Prior Publication Data

US 2023/0417348 A1     Dec. 28, 2023

Related U.S. Application Data

(63) Continuation of application No. 16/973,901, filed as application No. PCT/IL2020/050306 on Mar. 15, 2020, now Pat. No. 11,788,654.

(Continued)

(51) Int. Cl.
*F16L 23/22* (2006.01)
*F16L 23/00* (2006.01)
*F16L 23/08* (2006.01)

(52) U.S. Cl.
CPC ............. *F16L 23/22* (2013.01); *F16L 23/003* (2013.01); *F16L 23/08* (2013.01)

(58) Field of Classification Search
CPC . F16L 23/22; F16L 23/08; F16L 23/10; F16L 23/003; F16L 21/065; F16L 17/02; F16L 17/04; F16L 17/025

See application file for complete search history.

(56) References Cited

U.S. PATENT DOCUMENTS 4,326,737 A *  4/1982  Lehmann ................ F16L 23/04
                                                        285/365
9,168,585 B2   10/2015  Schell et al.
(Continued)

FOREIGN PATENT DOCUMENTS

CN     108700233 A      10/2018
EP       0132192 A1      1/1985
(Continued)

OTHER PUBLICATIONS

PCT International Search Report for International Application No. PCT/IL2020/050306, mailed Jul. 16, 2020, 7pp.

(Continued)

*Primary Examiner* — Aaron M Dunwoody
(74) *Attorney, Agent, or Firm* — The Roy Gross Law Firm, LLC; Roy Gross

(57) ABSTRACT

A pipe coupling assembly (200) for use with a seal (16) for sealing end portions of pipe elements (34), including: first and second coupling segments (10), each including a curved portion (12) having an inner surface (14) shaped to define an annular channel and shaped and sized to receive the seal therein. A fastening lug member (18) extends from the curved portion, the fastening lugs of the first and second coupling segments at least partially overlap when the fastening lug members are drawn towards each other. At least one restrainer (30) extending from an end (58) of the fastening lug member and in continuation with the inner surface of the curved portion of at least one of the coupling segments, inhibits trapping of the seal between the fastening lug members when the fastening lug members are drawn toward each other. Other embodiments are also described.

3 Claims, 17 Drawing Sheets

Related U.S. Application Data

(60) Provisional application No. 62/818,217, filed on Mar. 14, 2019.

(56) References Cited

U.S. PATENT DOCUMENTS

| | | |
|---|---|---|
| 2008/0048444 A1 | 2/2008 | Porter et al. |
| 2011/0062706 A1* | 3/2011 | Henry .................... F16L 17/04 |
| | | 285/356 |
| 2012/0256416 A1 | 10/2012 | Ikeda et al. |
| 2012/0256418 A1 | 10/2012 | Horgan |
| 2013/0257045 A1 | 10/2013 | Mikami |
| 2018/0163905 A1 | 6/2018 | Ohnemus et al. |

FOREIGN PATENT DOCUMENTS

| | | |
|---|---|---|
| GB | 2200420 A | 8/1988 |
| WO | 2011056512 A1 | 5/2011 |
| WO | 2018222604 A1 | 12/2018 |

OTHER PUBLICATIONS

PCT Written Opinion for International Application No. PCT/IL2020/050306, mailed Jul. 16, 2020, 12pp.
PCT International Preliminary Report for International Application No. PCT/IL2020/050306, issued Aug. 25, 2021 13pp.

* cited by examiner

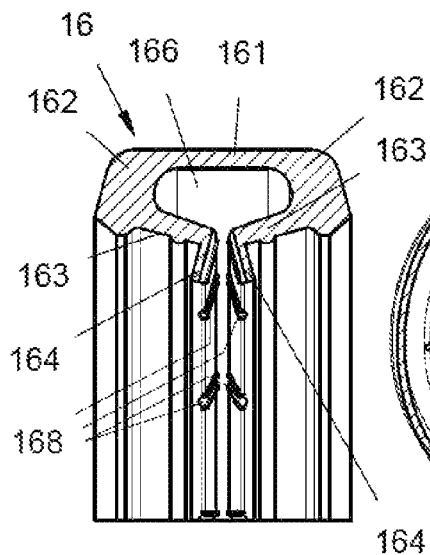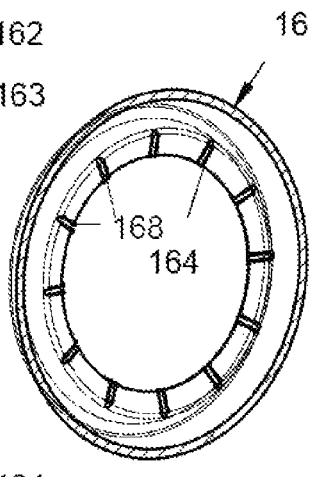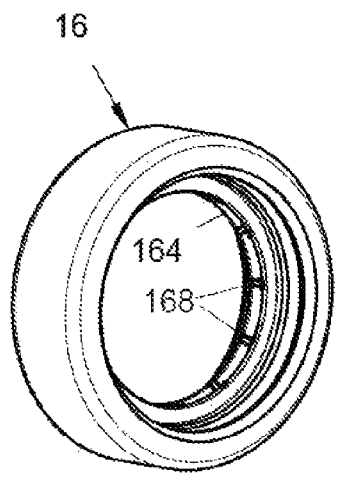
FIG. 5A         FIG. 5B         FIG. 5C
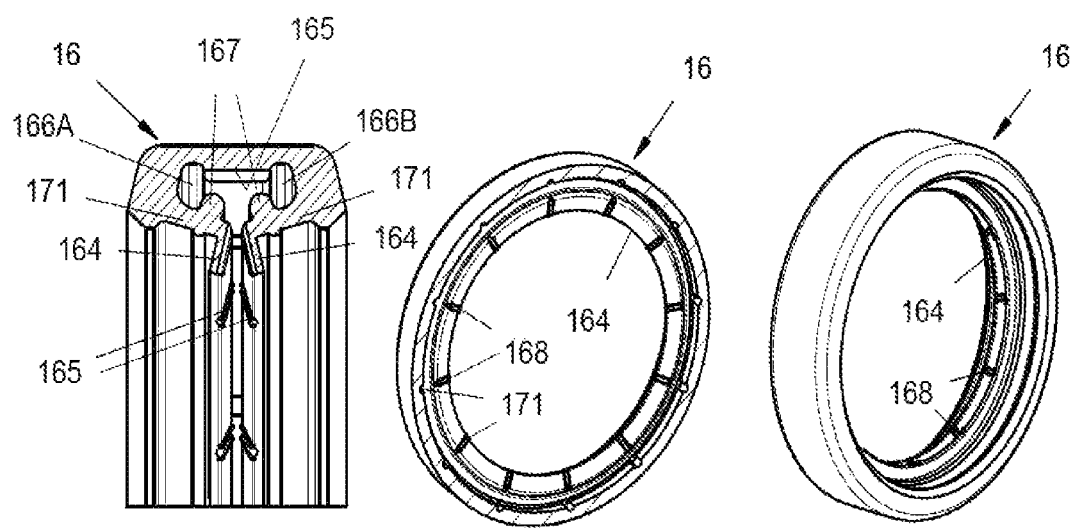
FIG. 6A         FIG. 6B         FIG. 6C

GROOVED PIPE COUPLING WITH IMPROVED SEALING

CROSS REFERENCE TO RELATED APPLICATIONS

This application is a Continuation of U.S. patent application Ser. No. 16/973,901 filed Dec. 10, 2020, which is a National Phase of PCT Patent Application No. PCT/IL2020/050306 having International filing date of Mar. 15, 2020, which claims the benefit of priority under 35 USC § 119(e) of U.S. Provisional Patent Application No. 62/818,217 titled "GROOVED PIPE COUPLING WITH IMPROVED SEALING" filed Mar. 14, 2019, the contents of which are incorporated herein by reference in their entirety.

FIELD OF THE INVENTION

Embodiments of the present invention relate generally to the field of mechanical coupling elements and more specifically to pipe couplings and sealing elements.

BACKGROUND

Pipe couplings generally allow two pipes to be joined. Typically, the ends of the pipes are aligned co-axially and a rubber gasket is fitted over the pipe ends to provide a fluid tight seal. A two-part metal coupling is positioned around the pipe ends and the rubber gasket and is screwed together with bolt/s and nut/s to hold the pipes together even under high internal pressure. Grooved couplings have rims that act as keys that engage circumferential grooves that extend around each of the pipe elements to be joined.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with some embodiments of the present invention, a pipe coupling assembly for use with a seal, configured to seal end portions of pipe elements.

In some embodiments, the pipe coupling assembly includes at least two coupling segments (e.g., first and second coupling segments). Typically, each coupling segment includes a curved portion having a first end and a second end, and an inner and outer surfaces extending between the first and second ends, the inner surface shaped to define an inner surface annular channel shaped and sized to receive the seal therein.

In some embodiments the seal includes a resilient yet flexible elastomeric ring configured to engage the ends of the pipe element (when the pipe elements are co-axially aligned in an end-to-end relation) to provide, together with the coupling segments a fluid tight seal.

In some embodiments, each one of the coupling segments includes a fastening lug member extending outward from the first end of the curved portion, the fastening lugs members of the first and second coupling segments configured to at least partially overlap when the fastening lug members are drawn towards each other to. The lugs are configured to be drawn together using a fastener (such as a nut and bolt) which is used to tighten the lugs thereby drawing the coupling segments together to couple the pipe elements.

In some embodiments, at least one restrainer extending from an end of the fastening lug member and in continuation with the inner surface of the curved portion of at least one of the coupling segments, is provided. The restrainer inhibits trapping of the seal between the fastening lug members when the fastening lug members are drawn toward each other. Thereby, the restrainer prevents damage to the seal by maintaining the integrity of the seal, resulting in prolonging the lifetime of the seal.

Typically, the restrainer slides along an outer surface of the seal to physically block radial deformation (e.g., projection) of the seal. Additionally, or alternatively, the restrainer closes a gap between the first and second segments when the fastening lug members are drawn toward each other, thereby inhibiting outward bulging of the seal that may result in pinching and trapping of the seal between the fastening lugs of the first and second segments.

In some embodiments, opposing ends of the fastening lug members of the first and the second coupling segments each comprise at least one restrainer, and for some embodiments the restrainers of opposing ends are arranged in a staggered manner such that when the fastening lugs are drawn toward each other the restrainers interlock.

There is therefore provided in accordance with some embodiments of the present invention, A pipe coupling assembly for use with a seal configured to seal end portions of pipe elements, the pipe coupling assembly including: first and second coupling segments, each coupling segment including: a curved portion having a first end and a second end and an inner surface extending between the first and second ends, the inner surface shaped to define an annular channel shaped and sized to receive the seal therein; a fastening lug member extending outward from the first end of the curved portion, the fastening lugs of the first and second coupling segments configured to at least partially overlap when the fastening lug members are drawn towards each other; at least one restrainer extending from an end of the fastening lug member and in continuation with the inner surface of the curved portion of at least one of the coupling segments, and configured to inhibit trapping of the seal between the fastening lug members when the fastening lug members are drawn toward each other.

In some embodiments, the at least one restrainer is configured to inhibit trapping of the seal between the lug members by sliding against an outer surface of the seal and blocking radially outward deformation of the seal when the fastening lug members are drawn toward each other.

In some embodiments, the at least one restrainer is configured to inhibit trapping of the seal by closing at least one gap between the first and second segments when the fastening lug members are drawn toward each other.

In some embodiments, the at least one restrainer includes a first restrainer in the first coupling segment and the pipe coupling assembly includes a second restrainer in the second coupling segment.

In some embodiments, at least one of the first or second coupling segments is shaped to define a groove on the inner surface of the end of the curved portion shaped and sized to slidingly receive a restrainer of a corresponding end of the opposing coupling segment when the fastening lug members are drawn toward each other.

In some embodiments, opposing ends of the fastening lug members of the first and the second coupling segments each include at least one restrainer, the restrainers of opposing ends being arranged in a staggered manner.

In some embodiments, the restrainers of opposing ends of the first and second coupling segments interlock when the fastening lug members are drawn toward each other.

In some embodiments, at least two restrainers in the first coupling segment positioned to define a recess between the two restrainers, and at least one restrainer in the second coupling segment configured to fit inside the recess when the fastening lug members are drawn toward each other.

In some embodiments, each coupling segment includes a hingeable lug member extending outward from the second end of the curved portion, and the pipe coupling assembly further includes a hinge member configured to hingedly couple the hingeable lug members of the first and second coupling segments thereby providing a hinged joint between the first and second segments.

In some embodiments, the hingeable lug member of one of the first or second coupling segments includes an arcuate lip and the hingeable lug member of the other one of the first or second coupling segments includes a rounded lug and the rounded lug is received in an inner region of the arcuate lip, thereby creating a hinged joint between the first and second segments.

In some embodiments, each of the coupling segments includes two arcuate lateral rim surfaces engageable with outer surfaces of the pipe elements when the fastening lug members are drawn towards each other.

In some embodiments, each one of the two arcuate lateral rim surfaces includes: two end portions, each end portion having an end portion radius of curvature, and a middle portion disposed between the two end portions and having a middle portion radius of curvature; and at least one of the end portion radii of curvature being different from the radius of curvature of the middle portion.

In some embodiments, the radius of curvature of the middle portion is greater than the radius of curvature of each one of the end portions.

In some embodiments, the pipe coupling assembly further includes at least one guiding surface formed on a portion of at least one of the arcuate lateral rim surfaces configured to guide the seal towards the inner surface of the curved portion.

In some embodiments, the guiding surface is configured to inhibit trapping of the seal by the arcuate lateral rim when the fastening lug members are drawn toward each other.

In some embodiments, the guiding surface further includes at least one grip-facilitating serrated protrusion configured penetrate the seal to press the seal against the pipe elements.

In some embodiments, the pipe coupling assembly further includes a fastener configured to be inserted in the fastening lug members of the first and second segments to draw the fastening lug members toward each other.

In some embodiments, the seal includes a resilient ring shaped to define an outer annular portion from which radially inwards extend left and right lateral portions, and left and right inner annular portions extend axially inwards from the left and right lateral portions, respectively.

In some embodiments, left and right central annular flaps extend radially inwards from the left and right inner annular portions, respectively.

In some embodiments, the pipe coupling assembly further includes a plurality of projecting tabs extending from the outer annular portion and positioned in a spaced apart relation to one another around a circumference of the outer annular portion, the plurality of projecting tabs being disposed between the left and right inner annular portions and projecting radially inwardly.

In some embodiments, the pipe coupling assembly further includes at least one elevated protrusion protruding from the inner surface of the curved portion and configured to (i) contact an outer surface of the seal when the seal is disposed in the annular channel, (ii) distance the inner surface of the curved portion from the outer surface of the seal such that a gap is formed between the outer surface of the seal that is not in contact with the elevated protrusion and the inner surface of the curved portion; and (iii) apply non-uniform pressure along the outer surface of the seal.

There is yet further provided in accordance with some embodiments of the present invention, a pipe coupling assembly for use with a seal configured to seal end portions of pipe elements, the pipe coupling assembly including: first and second coupling segments, each coupling segment including: a curved portion having a first end and a second end, and an inner surface extending between the first and second ends, the inner surface shaped to define an annular channel shaped and sized to receive the seal therein; a fastening lug member extending outward from the first end of the curved portion, the fastening lugs of the first and second coupling segments configured to at least partially overlap when the fastening lug members are drawn towards each other; and at least one elevated protrusion protruding from the inner surface of the curved portion and configured to (i) contact an outer surface of the seal when the seal is disposed in the annular channel, (ii) distance the inner surface of the curved portion from the outer surface of the seal such that a gap is formed between the outer surface of the seal that is not in contact with the elevated protrusion and the inner surface of the curved portion; and (iii) apply non-uniform pressure along the outer surface of the seal.

In some embodiments, the at least one elevated protrusion is configured to locally deform the seal into the gap when the fastening lug members are drawn towards each other.

In some embodiments, the at least one elevated protrusion is configured to apply the non-uniform pressure by applying localized pressure to a portion of the seal in contact with the elevated protrusion.

In some embodiments, the seal is configured for use with end portions of first and second pipe elements; and the at least one elevated protrusion is configured to increase a point of friction between the seal and the first pipe element to reduce movement of the first pipe element when the first pipe element is disposed in the seal prior to insertion of the second pipe element into the seal.

In some embodiments, the at least one elevated protrusion is configured to increase a point of friction between the seal and the first pipe element to reduce movement of the first pipe element when the first pipe element is disposed in the seal during insertion of the second pipe element into the seal.

In some embodiments, the at least one elevated protrusion includes 1-3 elevated protrusions.

In some embodiments, the at least one elevated protrusion has a height of 2-6 mm.

In some embodiments, the at least one elevated protrusion has a length of 15-20 mm.

In some embodiments, the at least one elevated protrusion has a width of 5-10 mm.

In some embodiments, each of the coupling segments includes two arcuate lateral rim surfaces engageable with outer surfaces of the pipe elements when the fastening lug members are drawn towards each other.

In some embodiments, each one of the two arcuate lateral rim surfaces includes two end portions, each end portion having an end portion radius of curvature, and a middle portion disposed between the two end portions and having a middle portion radius of curvature; and at least one of the end portion radii of curvature being different from the radius of curvature of the middle portion.

In some embodiments, the radius of curvature of the middle portion is greater than the radius of curvature of each one of the end portions.

In some embodiments, the seal includes a resilient ring shaped to define an outer annular portion from which radially inwards extend left and right lateral portions, and left and right inner annular portions extend axially inwards from the left and right lateral portions, respectively, and the seal further includes a plurality of projecting tabs extending from the outer annular portion and positioned in a spaced apart relation to one another around a circumference of the outer annular portion, the plurality of projecting tabs being disposed between the left and right inner annular portions and projecting radially inwardly.

There is additionally provided in accordance with some embodiments of the present invention, a pipe coupling assembly for use with a seal configured to seal end portions of pipe elements, the pipe coupling assembly including: first and second coupling segments, each coupling segment including: two arcuate lateral rim surfaces configured to engage with outer surfaces of the pipe elements; a curved portion disposed between the two arcuate lateral rim surfaces, having a first end and a second end, and an inner surface extending between the first and second ends, the inner surface shaped to define an annular channel shaped and sized to receive the seal therein; a fastening lug member extending outward from the first end of the curved portion, the fastening lugs of the first and second coupling segments configured to at least partially overlap when the fastening lug members are drawn towards each other; at least one guiding surface formed on a portion of at least one of the arcuate lateral rim surfaces configured to guide the seal towards the inner surface of the curved portion.

In some embodiments, the guiding surface is configured to inhibit trapping of the seal by the arcuate lateral rim when the fastening lug members are drawn toward each other.

In some embodiments, the guiding surface further includes at least one grip-facilitating serrated protrusion configured penetrate the seal to press the seal against the pipe elements.

There is yet additionally provided in accordance with some embodiments of the present invention, a pipe coupling assembly for use with a seal configured to seal end portions of pipe elements, the pipe coupling assembly including: first and second coupling segments, each coupling segment including: two arcuate lateral rim surfaces configured to engage with outer surfaces of the pipe elements; a curved portion disposed between the two arcuate lateral rim surfaces, having a first end and a second end, an outer surface and an inner surface extending between the first and second ends, the inner surface shaped to define an annular channel shaped and sized to receive the seal therein; and a fastening lug member extending outward from the first end of the curved portion, the fastening lugs of the first and second coupling segments configured to at least partially overlap when the fastening lug members are drawn towards each other; each one of the two arcuate lateral rim surfaces includes: two end portions, each end portion having an end portion radius of curvature, and a middle portion disposed between the two end portions and having a middle portion radius of curvature; and at least one of the end portion radii of curvature of each one of the end portions being different from the radius of curvature of the middle portion.

In some embodiments, the radius of curvature of the middle portion is greater than the radius of curvature of each one of the end portions.

In some embodiments, the radius of curvature of the each one of the end portions is the same.

There is yet further provided in accordance with some embodiments of the present invention a pipe coupling assembly including: at least two segments, each the segment including: a curved portion with an inner annular recess; a fastening ear that extends radially outwards from a first end of the curved portion, the fastening ear including fastening structure; a hinge member that extends radially outwards from a second end of the curved portion; two lateral outer annular rims; and anti-pinching structure including a circumferential tongue extension that extends from a periphery of the inner annular recess.

In some embodiments, the anti-pinching structure extends circumferentially beyond the fastening ear.

In some embodiments, the anti-pinching structure includes a ramp whose outer surface is inclined.

In some embodiments, the anti-pinching structure is positioned between the two lateral outer annular rims.

In some embodiments, the hinge member includes an arcuate lip and a rounded lug positioned laterally next to each other, and the rounded lug of one of the segments is received in an inner region of the arcuate lip of the other of the segments, thereby creating a hinged joint between the segments.

In some embodiments, the segments are coupled together with the hinge members over adjoining pipe segments and a fastener tightens the fastening ears towards each other.

In some embodiments, each of the pipe elements is formed with an annular groove spaced axially from an end of the pipe element and the lateral outer annular rims are received in the annular grooves and a seal is received in the inner annular recess.

In some embodiments, the seal includes an outer annular portion from which radially inwards extend left and right lateral portions, and left and right inner annular portions extend axially inwards from the left and right lateral portions, respectively, and left and right central annular flaps extend radially inwards from the left and right inner annular portions, respectively, and the left and right central annular flaps are positioned between adjoining ends of the pipe elements.

In some embodiments, outer annular portion, the left and right lateral portions and the left and right inner annular portions define an annular chamber which is in fluid communication with a fluid flowing in the pipe elements.

In some embodiments, the left and right central annular flaps include abutments, which mutually press against each other when the seal is installed between the pipe elements.

In some embodiments, the left and right central annular flaps include left and right radially-outward extending protuberances.

In some embodiments, the segment includes a curved portion with an inner annular recess which is not semicircular.

In some embodiments, segment includes a radially-inward bump.

In some embodiments, seal includes one or more radial protrusions which are received in one or more recesses formed in the inner annular recess of each the curved portion.

There is yet further provided in accordance with some embodiments of the present invention, a seal including an outer annular portion from which radially inwards extend left and right lateral portions, and left and right inner annular portions extend axially inwards from the left and right lateral portions, respectively, and left and right central annular flaps extend radially inwards from the left and right inner annular portions, respectively.

In some embodiments, outer annular portion, the left and right lateral portions and the left and right inner annular portions define an annular chamber.

In some embodiments, the left and right central annular flaps include abutments which are mutually pressable against each other.

In some embodiments, the left and right central annular flaps include left and right radially-outward extending protuberances.

In some embodiments, the seal includes one or more radial protrusions.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 5A, 5B and 5C are simplified cross-sectional, partially sectional and perspective illustrations, respectively, of a seal used in the pipe coupling, in accordance with a non-limiting embodiment of the present invention;

FIGS. 6A, 6B, 6C, 6D and 6E, are simplified cross-sectional, partially sectional and perspective illustrations, respectively, of a seal used in the pipe coupling, in accordance with additional non-limiting embodiments of the present invention;

DETAILED DESCRIPTION

Figure 1:
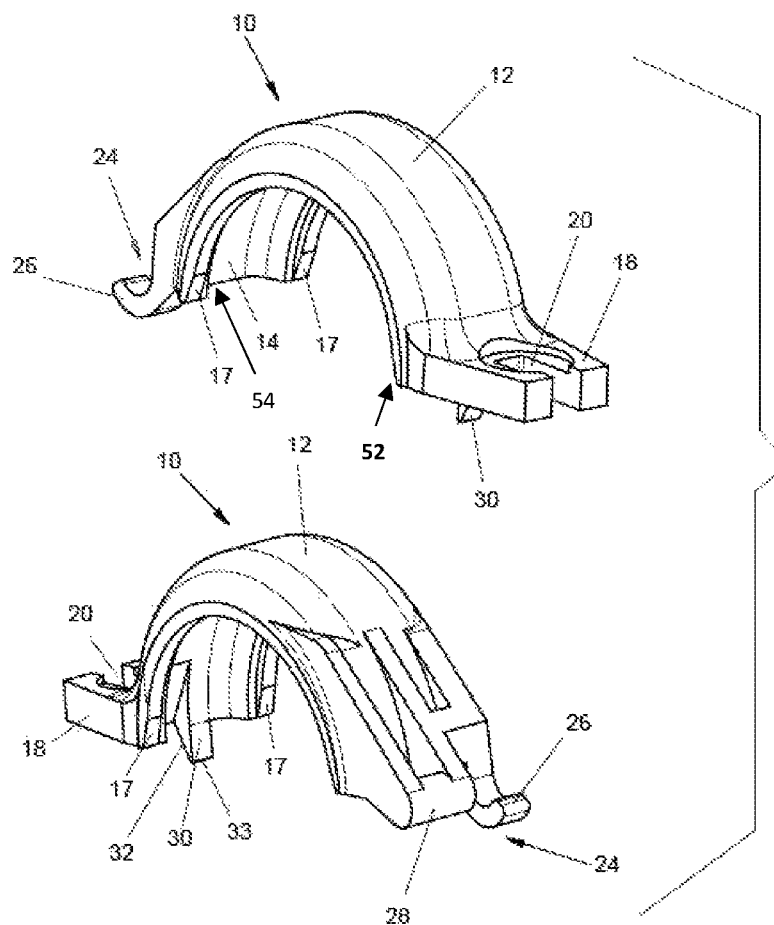
FIG. 1 is a simplified pictorial illustration of views of coupling segments of a pipe coupling assembly, constructed and operative in accordance with a non-limiting embodiment of the present invention.

Disclosed herein in accordance with some embodiments of the present invention, a pipe coupling assembly for use with a seal, and configured to seal end portions of pipe elements.

The term "pipe element" is used herein to describe any pipe-like item or component having a pipe like form. Pipe elements include, without limitation, pipe stock, pipe fittings such as elbows, caps and tees as well as fluid control components such as valves, reducers, strainers, restrictors, pressure regulators and the like.

In accordance with some aspects of the present invention, the pipe coupling assembly comprises two coupling segments (in some aspects the two segments are hingedly coupled at one end of the segments) that are configured to be tighten around pipe element ends to join the pipes together.

In accordance with some aspects of the present invention, the pipe coupling segments are provided with at least one restrainer configured to inhibit trapping of the seal between the fastening lug members when the fastening lug members are drawn toward each other. Thereby, the restrainer prevents damage to the seal by maintaining the integrity of the seal, resulting in prolonging the working life of the seal. Typically, the restrainer slides along an outer surface of the seal to physically block radial deformation (e.g., projection) of the seal. Additionally, or alternatively, the restrainer closes a gap between the first and second segments when the fastening lug members are drawn toward each other, thereby inhibiting outward bulging of the seal that may result in pinching and trapping of the seal between the fastening lugs of the first and second segments.

In accordance with some aspects of the present invention, the coupling segments are shaped to define an elevated protrusion protruding from an inner surface channel of a curved portion of the coupling segment. The elevated protrusion contacts an outer surface of the seal when the seal is disposed in the inner surface annular channel and to distance the inner surface of the curved portion of the coupling segment from the outer surface of the seal such that a gap is formed between the outer surface of the seal that is not in contact with elevated protrusion and inner surface of the curved portion. Additionally, the elevated protrusion applies non-uniform pressure along the outer surface (outer circumference) of the seal. Typically, the elevated protrusion applies the non-uniform pressure by applying localized pressure to a portion of seal in contact with elevated protrusion 120. In some aspects elevated protrusion 120 increases a point of friction between seal 16 and the first pipe element to reduce movement of the first pipe element when the first pipe element is disposed inside the seal prior to and/or during insertion of the second pipe element into the seal.

In accordance with some aspects, the coupling segments are shaped to define arcuate lateral rim surfaces that engage the pipe elements when the pipe coupling assembly is tightened around the pipe elements. In some aspects the arcuate lateral rim surfaces have portions of varying radii (e.g., 2 or 3 different radii along a circumference of the rim).

In accordance with some aspects of the present invention, the arcuate lateral rim surfaces are further shaped to define a guiding surface including one or more projecting guiding elements configured to inhibit trapping of the seal by arcuate lateral rim when fastening lug members are drawn toward each other and guiding the seal into place within the inner surface channel of the curved portion of the coupling segment. For some aspects the guiding elements are blunt. Additionally, or alternatively, the guiding surface further includes at least one grip-facilitating serrated (sharp) protrusion configured penetrate (e.g., get lodged in) the seal to press the seal against pipe elements 34.

Reference is first made to FIG. 1, FIGS. 2A-2C, and FIGS. 3A-F which illustrate pipe coupling assembly 200 and components thereof.

In some embodiments, the pipe coupling assembly includes at least two coupling segments (e.g., first and second coupling segments). FIG. 1 are views of coupling segment 10, constructed and operative in accordance with a non-limiting embodiment of the present invention. As shown, segment 10 comprises a curved (such as, but not necessarily, semi-circular) portion 12. Curved portion 12 has a first end 52 and a second end 54 and an inner surface 14 extending between the first and second ends and shaped to define an inner annular channel (e.g., recess) shaped and sized for receiving therein seal 16. Seal 16 typically comprises a circumferential elastomeric ring seal disposed inside inner surface channel 14 and extending along a major portion, but not all, of the width of inner surface channel 14 (for example, in accordance with some embodiments of the present invention, inner surface channel 14 has a width that is about 1-2 mm, e.g., about 1.5 mm greater than a width of an outer diameter of seal 16). Embodiments of seal 16 are shown for example in FIGS. 2A-2C, FIGS. 4 and 6A-E.

Additionally, as shown in FIG. 1, segment 10 comprises a fastening lug member (e.g., a fastening ear) 18. Fastening lug member 18 extends outward (e.g., radially outward) from first end 52 of curved portion 12. As noted, pipe coupling assembly 200 comprises at least two segments 10 (e.g., first and second opposing segments 10), such that fastening lugs 18 of the first and second coupling segments 10 at least partially overlap when fastening lug members 18 are drawn towards each other to close segments 10 around pipe elements.

Figure 2A:
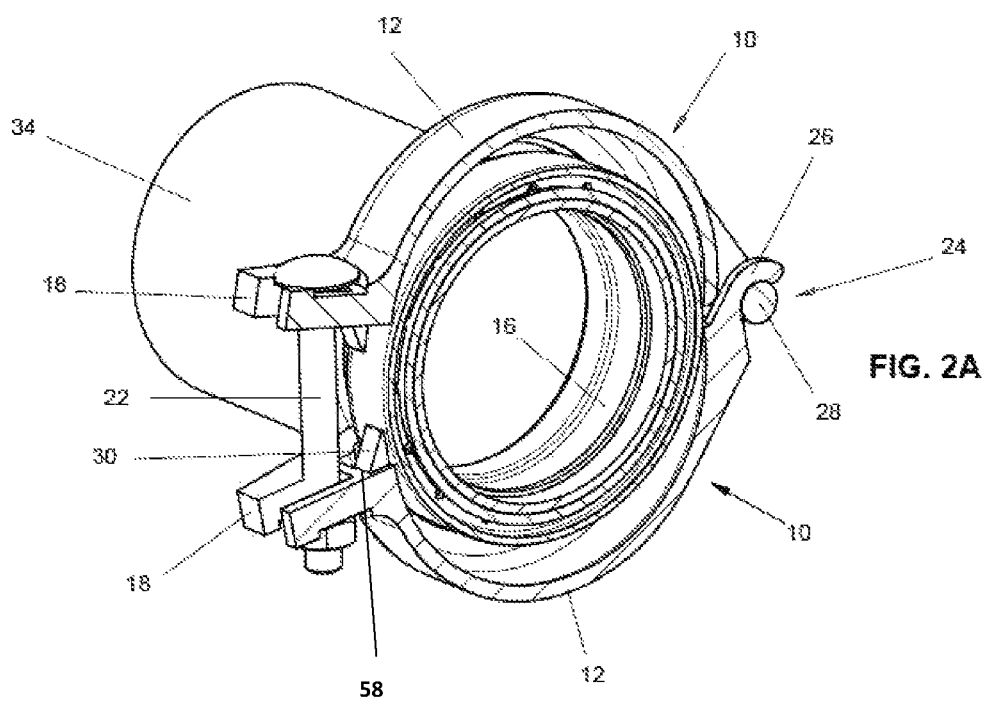
FIGS. 2A, 2B and 2C are simplified, partially sectional illustrations of the pipe coupling made of the segments of FIG. 1, installed on a pipe element, respectively before tightening, partially tightened and fully tightened, with a non-limiting embodiment of the present invention.
Figure 2B:
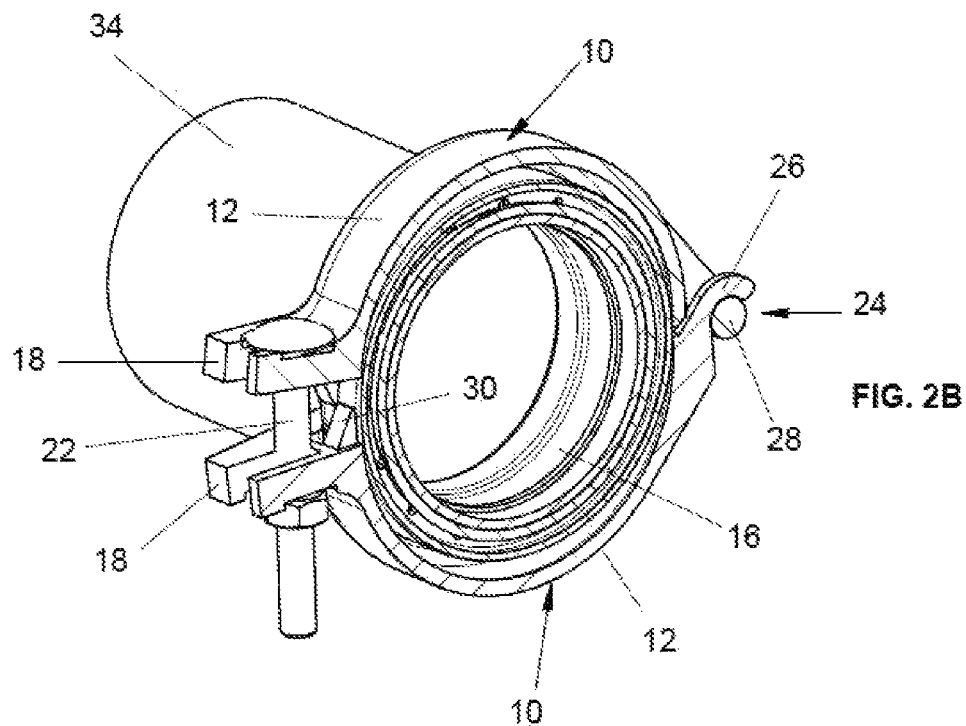
Figure 2C:
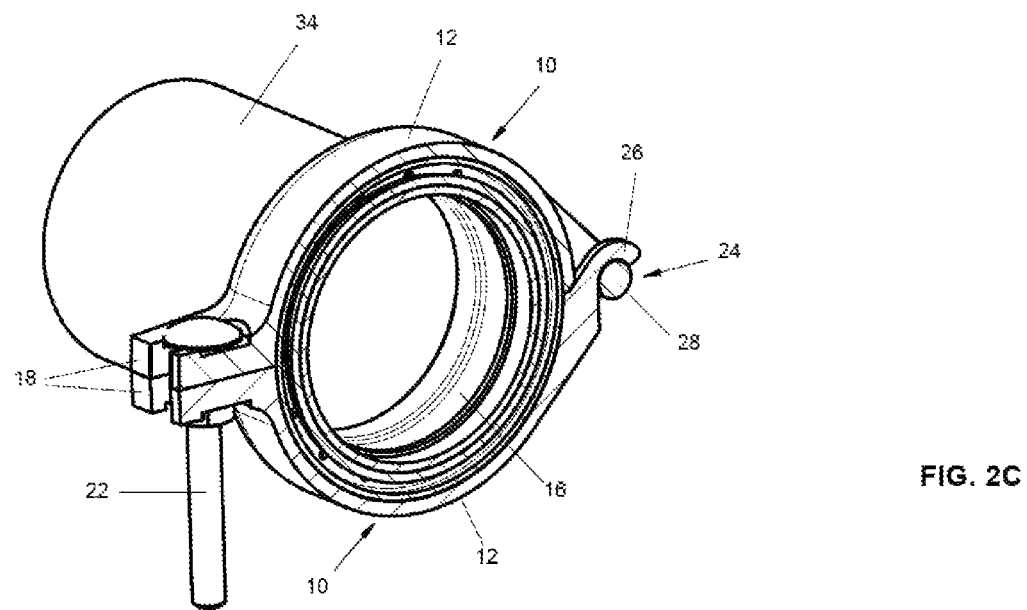

Fastening lug 18 typically includes a fastening structure, such as an aperture 20 (FIG. 1) for receiving a fastener 22, such as a bolt and nut (FIGS. 2A-2C).

In some embodiments, coupling segment 10 comprises a hingeable lug member 24 extending outwards (e.g., radially outward) from a second end (opposite to the first end) of curved portion 12 (ends 52 and 54). In some embodiments, hingeable lug member 24 includes an arcuate lip 26 and a rounded lug 28 positioned laterally next to each other. The rounded lug 28 of one of the segments 10 is received in the inner region of the arcuate lip 26 of the other segment 10, as seen in FIGS. 2A-2C, thereby creating a hinged joint between the segments 10, in which the rounded lug 28 serves as the pivot or hinge pin of the hinged joint.

In some embodiments, a hinge member (e.g., a clip 68 shown in FIG. 3C) hingedly couples the hingeable lug members 24 of the first and second coupling segments 10.

Each coupling segment 10 includes two arcuate lateral rim surfaces 17, which will be received in grooves of the pipe elements, as will be explained further below with reference to FIG. 4. Typically, arcuate lateral rim surfaces 17 project radially inwardly from coupling segment 10 and engage circumferential grooves on the ends of the pipe elements to be joined. When lug members 18 are drawn towards each other, segments 10 are movable toward one another such that arcuate lateral rim surfaces 17, engage the pipe elements. Additionally, when lug members 18 are drawn towards each other, segments 10 are movable toward one another causing compressing of seal 16 that is disposed in curved portion 12. Seal 16 is deformable by the inward movement of coupling segments 10.

A possible problem with grooved pipe and coupling segment connections is that as the coupling segments are tightened towards each other they can sometimes pinch the elastomeric seal. This results in undesirable non-uniform compression of the seal and can cause undesirable extrusion paths for the seal when deformed under pressure. In other words, as the coupling segments are tightened towards each other, the seal may bulge out, by projecting radially outward, resulting in trapping of the seal by the fastening lugs. These undesirable factors can compromise the integrity of the sealed connection and diminish the working life of the seal.

In contrast, some embodiments of the present invention provide segment 10 with a at least one restrainer (e.g., an anti-pinching structure) 30 which is configured to inhibit (e.g., reduce or completely prevent) trapping of seal 16 by fastening lugs 18 when lugs 18 are drawn towards each other during tightening of opposing segments 10.

Restrainer 30 is typically shaped to define a restraining projection extending generally perpendicular to fastening lugs 18 so as to block bulging of seal 16 in a direction generally parallel to lugs 18 and into a gap between lugs 18 of two opposing segments 10.

Specifically, restrainer 30 extends from an end (e.g., end 58 shown in FIG. 2A) of fastening lug member 18 and in continuation with the inner surface 14 of curved portion 12 of coupling segment 10. In other words, restrainer 30 includes a circumferential tongue extension that extends from the periphery of the inner surface channel 14 circumferentially beyond fastening lug 18. As described, restrainer 30 inhibits trapping of seal 16 between fastening lug members 18 when the fastening lug members are drawn toward each other.

In some embodiments, restrainer 30 includes a ramp 32 (FIG. 1) whose outer surface is inclined (outer being defined as facing radially outwards away from the center of curvature of the segment). An outer edge 33 (FIG. 1) of ramp 32 may be sharp or blunt or rounded, for example. The restrainer 30 is positioned between the two lateral outer annular rims 17. There may be one or more of restrainer 30 on each segment.

Figure 3A:
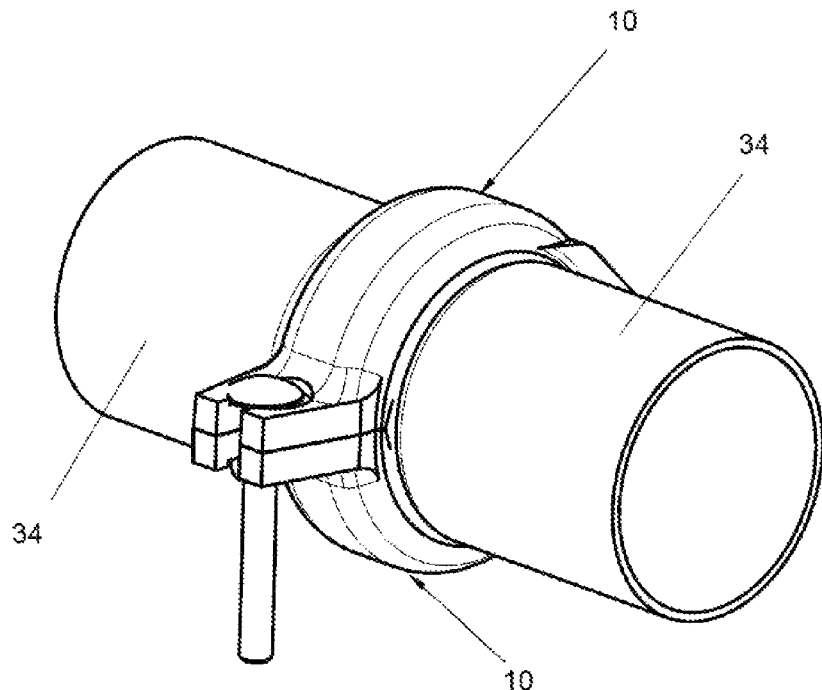
FIGS. 3A and 3B are simplified front and rear pictorial illustrations, respectively, of the pipe coupling assembly comprising of the coupling segments of FIG. 1, installed on pipe elements, with a non-limiting embodiment of the present invention.
Figure 3B:
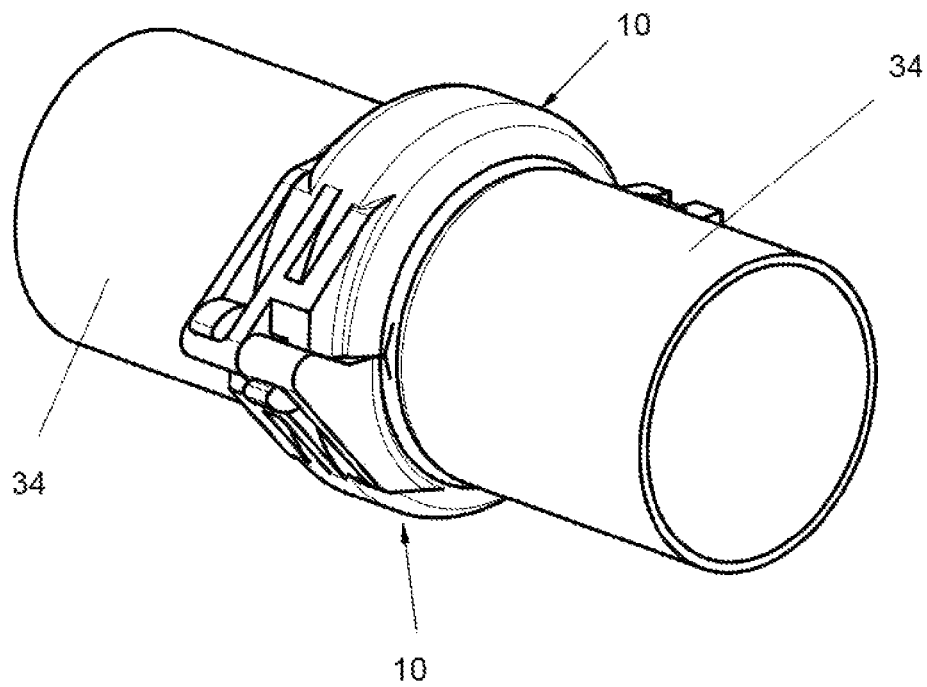
Figure 3C:
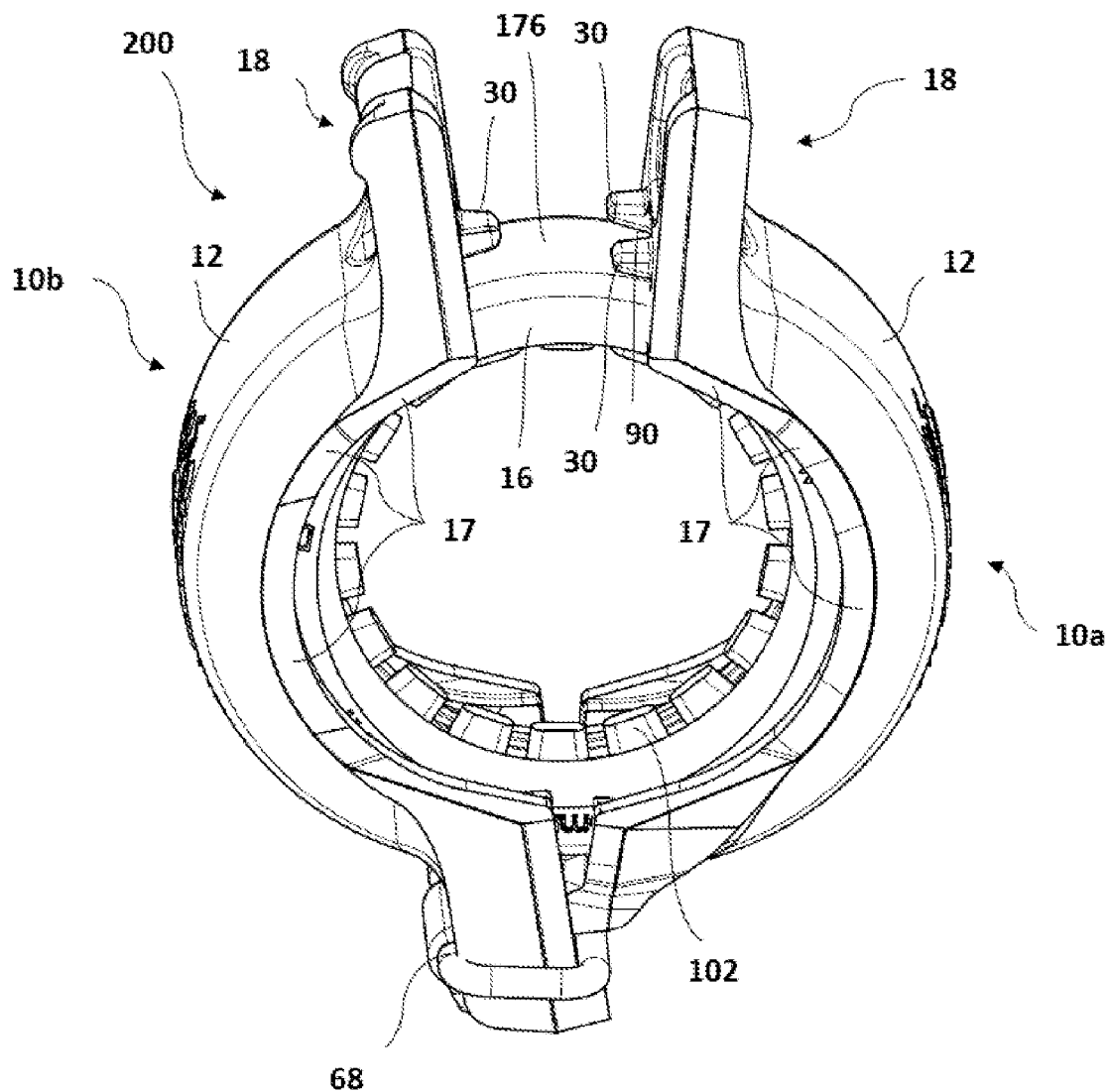
FIGS. 3C, 3D, 3E, and 3F are schematic illustrations of a pipe coupling assembly, comprising at least one restrainer in each of the coupling segments, in accordance with a non-limiting embodiment of the invention.
Figure 3D:
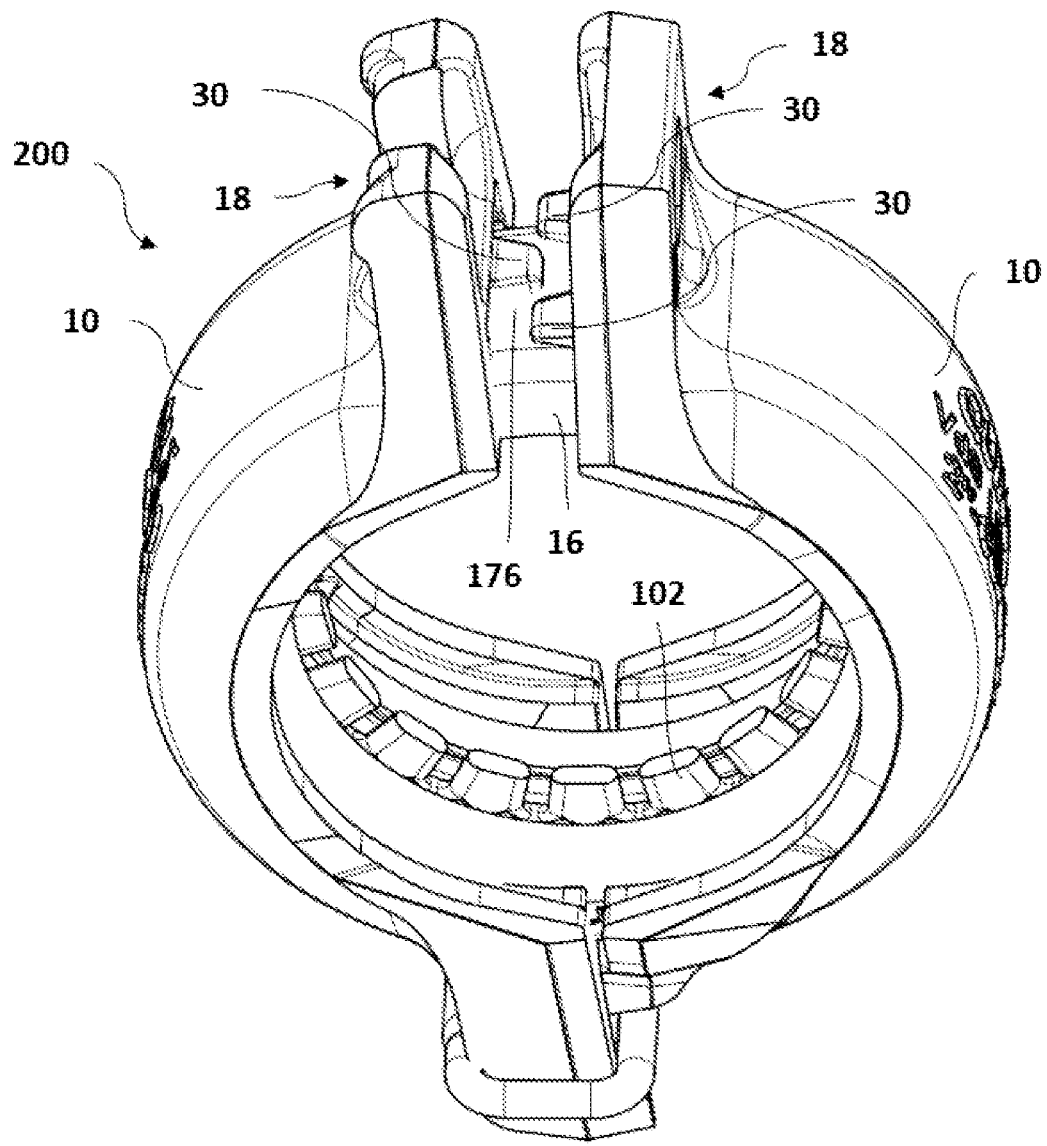
Figure 3E:
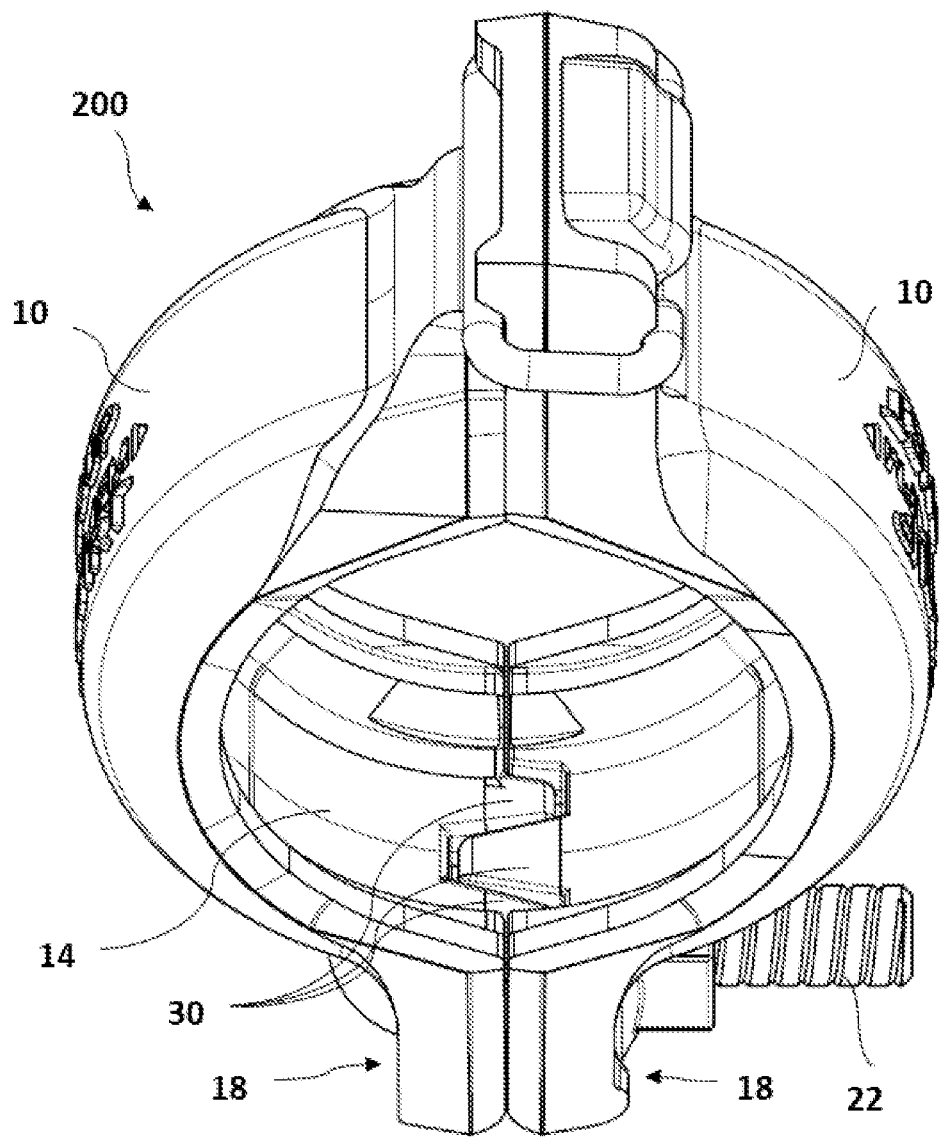
Figure 3F:
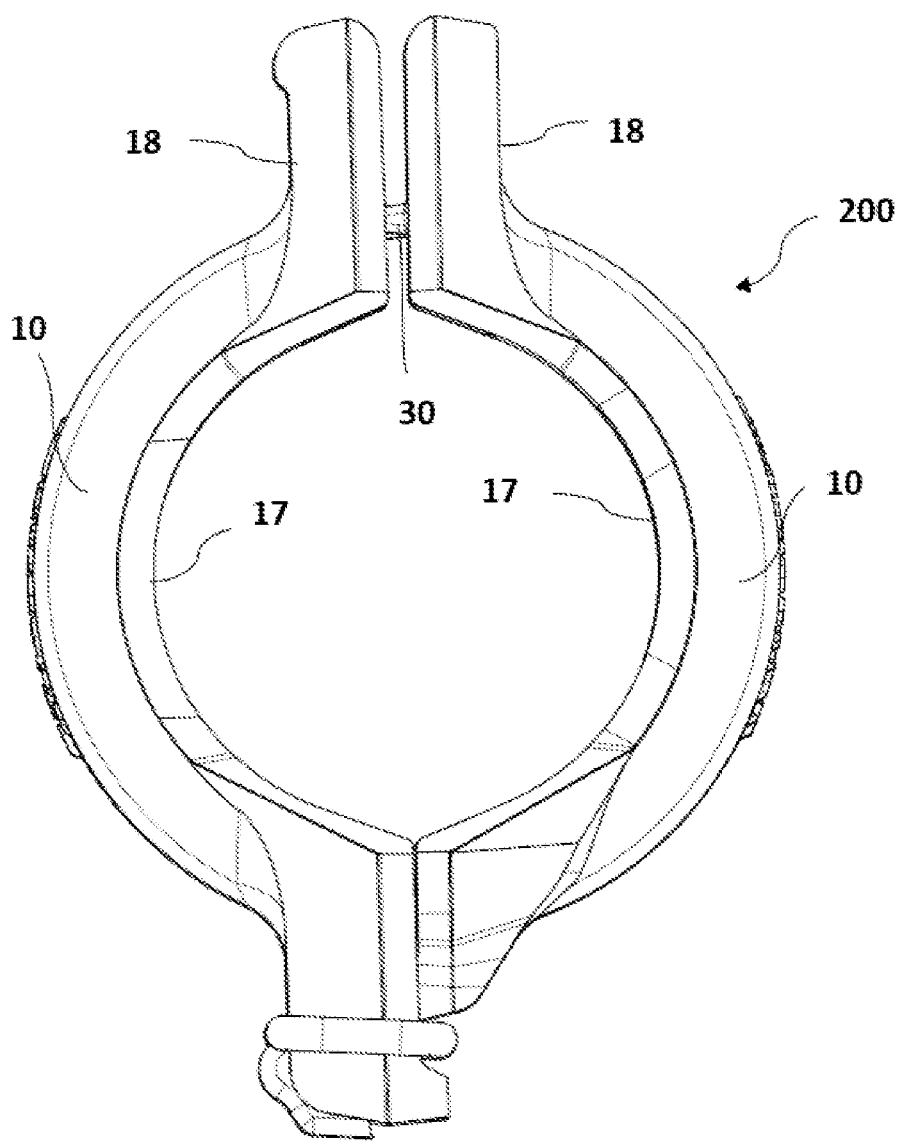

Reference is now to FIGS. 3C-3F, which are schematic illustrations of pipe coupling assembly 200 in accordance with some embodiments of the present invention. FIGS. 3C-3D show pipe coupling assembly 200 with seal 16, and FIGS. 3E-3F show pipe coupling assembly without seal 16, for clarity. It is noted that any embodiment of a seal described herein (e.g., embodiments of seal 16 and/or embodiments of seal 80), may be used with pipe coupling assembly 200 and segments 10 (and segments 10a and 10b), as described with reference to FIGS. 1A-3F.

FIGS. 3C-3F illustrate pipe coupling assembly 200 having first and second opposing and hingedly-coupled, coupling segments 10a and 10b. As shown, each one of segments 10a and 10b comprise at least one restrainer 30. By way of illustration and not limitation, first coupling segment 10a comprises two restrainers 30 and second coupling segment 10b comprises one restrainer 30. It is noted that for some embodiments, first coupling segment 10a comprises one or more than two restrainers 30, and second coupling segment 10b comprises non or more than one restrainer 30.

Typically, restrainers 30 inhibit trapping of seal 16 between lug members 18 by sliding against an outer surface 176 of outer annular portion 161 of seal 16 and blocking radially outward deformation of seal 16 when fastening lug members 18 are drawn toward each other. Additionally, or alternatively, restrainers 30 inhibit trapping of the seal by closing at least one gap between the first and second segments when the fastening lug members are drawn toward each other.

For some embodiments, at least one of first or second coupling segments 10a or 10b is shaped to define a groove on the inner surface of the end of curved portion 12 shaped and sized to slidingly receive a restrainer 30 of a corresponding end of the opposing coupling segment when fastening lug members 18 are drawn toward each other.

For some embodiments, opposing ends of fastening lug members 18 of the first and the second coupling segments 10a and 10b each comprise at least one restrainer 30, the restrainers of opposing ends being arranged in a staggered manner.

Typically, restrainers 30 of opposing ends of the first and second coupling segments 10a and 10b, interlock to prevent trapping of seal 16 between lugs 18. As shown, restrainers 30 of coupling segment 10a define a recess 90 between the two restrainers 30, and restrainer 30 in the second coupling segment 10b is configured to fit inside recess 90 when fastening lug members 18 are drawn toward each other.

FIGS. 3C-F show restrainers 30 at different stages of closure of segments 10a and 10b, as lugs 18 are drawn toward each other. For clarity, fastener 22 is not shown in FIGS. 3C-3D. FIG. 3C, shows restrainers 30 in an open configuration prior to drawing lugs 18 toward each other. FIG. 3D shows restrainers 30 in a partially closed configuration during drawing lugs 18 toward each other. FIGS. 3E-F are views of pipe coupling assembly 200 in a fully closed (i.e., tightened) configuration, with restrainers 30 interlocking to close the gap between lugs 18 and inhibit outward deformation of seal 16, thereby facilitating uniform compression of seal 16 and inhibiting trapping of the seal by the lugs when the lugs are drawn toward each other.

Figure 6D:
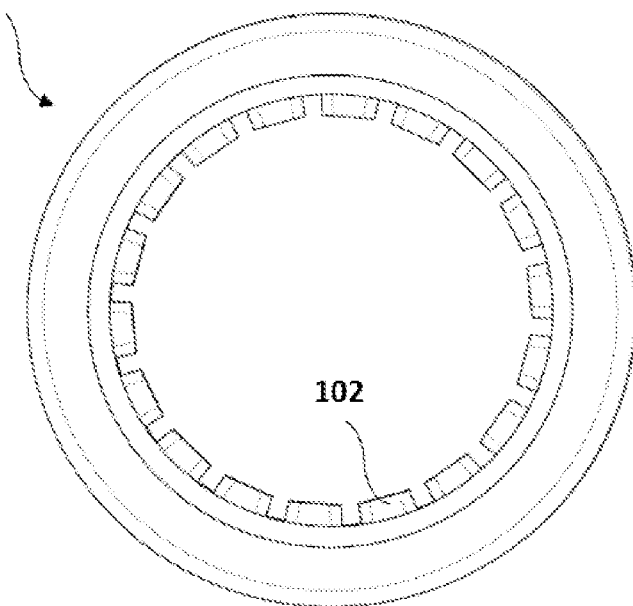
Figure 6E:
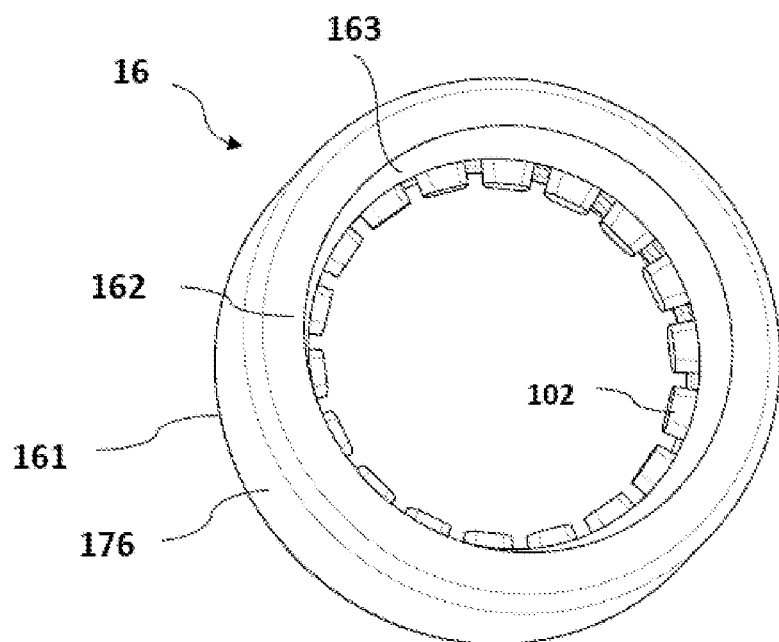

It is again noted that FIGS. 3C-3F, show seal 16 as illustrated in FIGS. 6D-E by way of illustration and not limitation. It is noted that any other embodiments of seal described herein may be used with coupling segments comprising any number of restrainers 30.

Reference is again made to FIGS. 2A, 2B and 2C which illustrate the pipe coupling made of segments 10 installed on a pipe element 34. FIGS. 2A, 2B and 2C illustrate the progression of tightening fastener 22: FIG. 2A shows the coupling before tightening; FIG. 2B shows the coupling partially tightened; and FIG. 2C shows the coupling fully tightened. As the fastener 22 progressively tightens the coupling and brings the fastening lugs 18 towards each other, restrainer 30 of each segment 10 cooperate with each other (e.g., the ramps slide over each other) to prevent bunching and pinching of seal 16. Accordingly, in embodiments of the present invention the segments of the coupling do not bunch or pinch the elastomeric seal and tightening fastener 22 results in uniform compression of seal 16 with no undesirable extrusion paths, thereby maintaining the integrity of the sealed connection and prolongs the working life of the seal 16.

Reference is again made to FIGS. 3A and 3B. FIGS. 3A-3B illustrate the pipe coupling made of segments 10 installed on, and coupling together, two end-to-end pipe elements 34.

Figure 4:
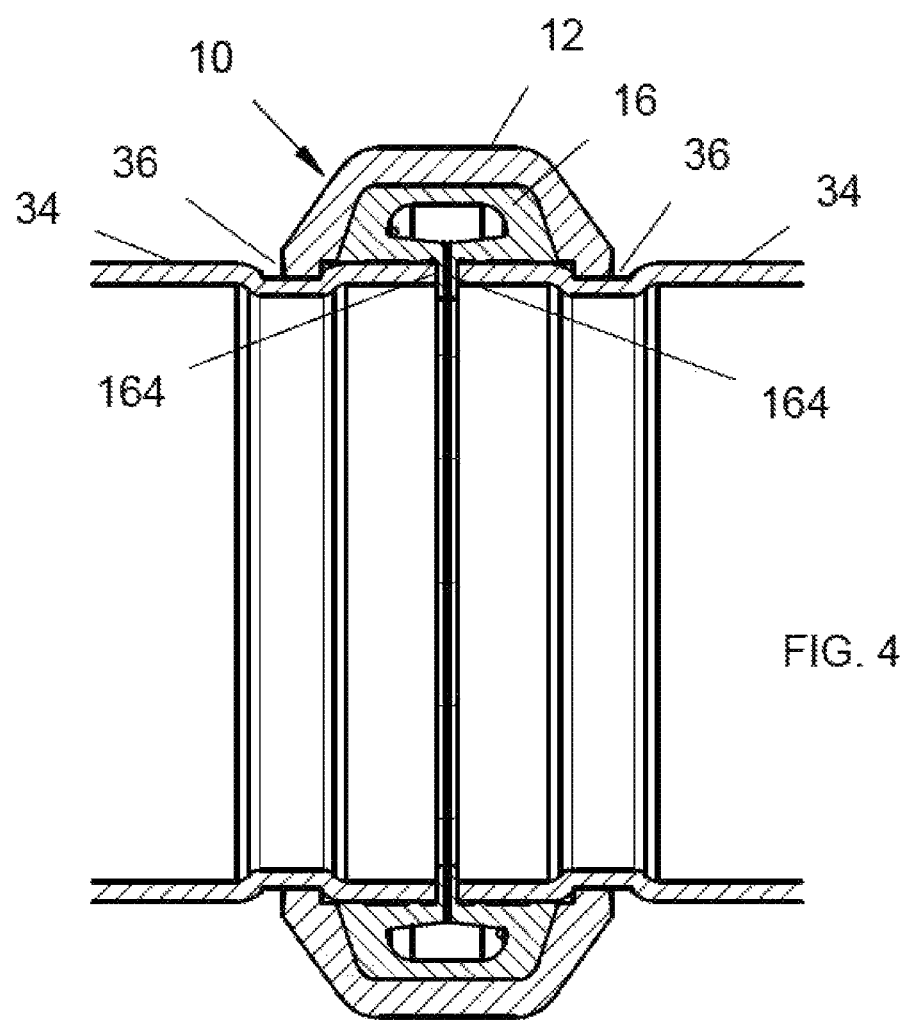
FIG. 4 is a simplified sectional illustration of a seal used in the pipe coupling, in accordance with a non-limiting embodiment of the present invention.

Reference is now made to FIG. 4, which illustrates seal 16 as used with the pipe coupling, in accordance with a non-limiting embodiment of the present invention. Pipe element 34 is formed with an annular groove 36 spaced axially from an end of the pipe element 34. Arcuate lateral rim surfaces 17 of segments 10 form coupling keys that are received in annular grooves 36.

Reference is now made to FIGS. 5A, 5B and 5C which are simplified cross-sectional, partially sectional and perspective illustrations, respectively, of some embodiments of seal 16 used in the pipe coupling. Seal 16 includes an outer annular portion 161 from which radially inwards extend left and right lateral portions 162. Left and right inner annular portions 163 extend axially inwards from left and right lateral portions 162, respectively. Lateral portions 162 and the left and right inner annular portions 163 are positioned spaced apart on opposite sides of sealing ring 16. Portions 163 project substantially inwardly toward one another and are configured to engage outer surfaces of pipe elements 34 and form a fluid tight seal when the seal is compressed by segments 10.

Left and right inner annular portions 163 form an inner surface of the seal and are configured to engage the outer surfaces of pipe elements 34. Typically, the seal inner surface (formed by portions 163) has a diameter sized to receive pipe elements 34. Typically, the inner diameter of seal 16 is smaller than the outer diameter of pipe elements 34 and does not go beyond a maximal diameter. Seal 16 typically hold segments 10 in an open position to allow insertion of pipe elements 34 into seal 16 and between segments 10.

Optionally, in some embodiments, seal 16 comprises left and right central annular flaps 164 extend radially inwards from left and right inner annular portions 163, respectively. As seen in FIG. 4, the left and right central annular flaps 164 are positioned in the gap between adjoining ends of the pipe elements 34. The left and right central annular flaps 164 serve as stops and fluid-tight seals against which the pipe elements 34 abut when the pipe elements 34 are pressed or pushed together during assembly of the pipe elements 34 in a pipeline or other installation. The outer annular portion 161, left and right lateral portions 162 and left and right inner annular portions 163 define an annular chamber 166 (FIG. 5A). The annular chamber 166 is in fluid communication with a fluid (not shown) flowing in the pipe elements 34. The fluid enters annular chamber 166 and applies pressure therein to increase tightening of the seal 16.

As seen in FIG. 5A-C, the left and right central annular flaps 164 may include abutments 168, which mutually press against each other when the seal 16 is installed between the adjoining pipe elements 34. These abutments 168 increase the sealing pressure of the seal 16 due to their small area compared to the total area of the flaps 164. (Sealing pressure is the sealing force divided by the area; the smaller the area, the greater the pressure.)

Reference is now made to FIGS. 6A, 6B and 6C which illustrate an alternative optional construction of seal 16, in which the left and right central annular flaps 164 include left and right radially-outward extending protuberances 167, in accordance with some embodiments of the present invention. Protuberances 167 can abut against the inner annular periphery 165 of outer annular portion 161, when the seal 16 is fully tightened, thereby creating two annular sub-chambers 166A and 166B. As before, fluid can enter annular sub-chambers 166A and 166B and apply pressure therein to increase tightening of the seal 16. Optionally, channels 171 (seen in the sectional view of FIG. 6B and also shown in hidden lines in FIG. 6A) may be formed in the seal adjacent annular sub-chambers 166A and 166B to permit fluid to flow to sub-chambers 166A and 166B. The channels may be in any suitable direction to divert flow to the sub-chambers. For some embodiments, seal 16 as shown in FIGS. 6A, 6B and 6C may additionally comprise projecting tabs 102 described hereinbelow with reference to FIGS. 6D-6E.

Reference is now made to FIGS. 6D-6E which are schematic illustration of yet another optional embodiment of seal 16 in accordance with some embodiments of the present invention. As shown, in some embodiments, seal 16 is shaped to define a plurality of projecting tabs 102 extending from outer annular portion 161 and positioned in a spaced apart relation to one another around a circumference of outer annular portion 161, the plurality of projecting tabs 102 being disposed between the left and right inner annular portions 163 and projecting radially inwardly. Projecting tabs 102 are disposed to facilitate locating coupling segments 10 relatively to pipe elements 34. In contrast to a continuous tongue extension around the circumference of outer annular portion 161, projecting tabs 102 ease manufacture of seal 16. Additionally, or alternatively, due to their segmented structure, projecting tabs 102 are able to bend in the direction of the flow of fluid inside pipe elements 34, thereby not interfering with the flow of fluid in the pipes, resulting in minimal head loss. This is in contrast to a continuous tongue that gets inserted into a joining point between the pipe elements and increases resistance in the pipes by interfering with the flow of the fluid in the pipes.

Figure 7A:
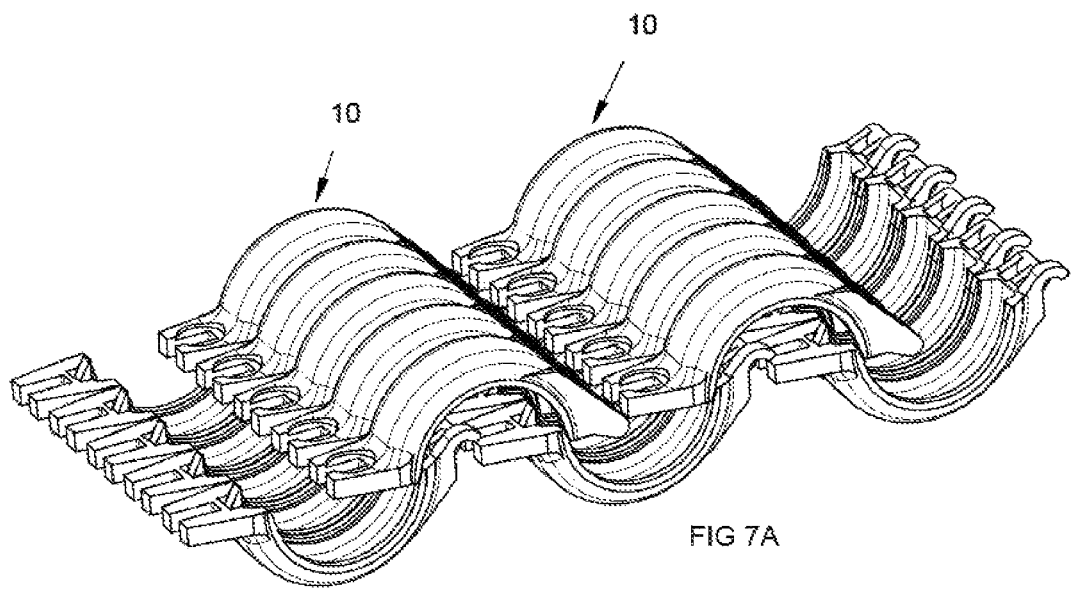
FIGS. 7A and 7B are simplified pictorial illustrations of two different stacking arrangements of the segments of the pipe coupling.
Figure 7B:
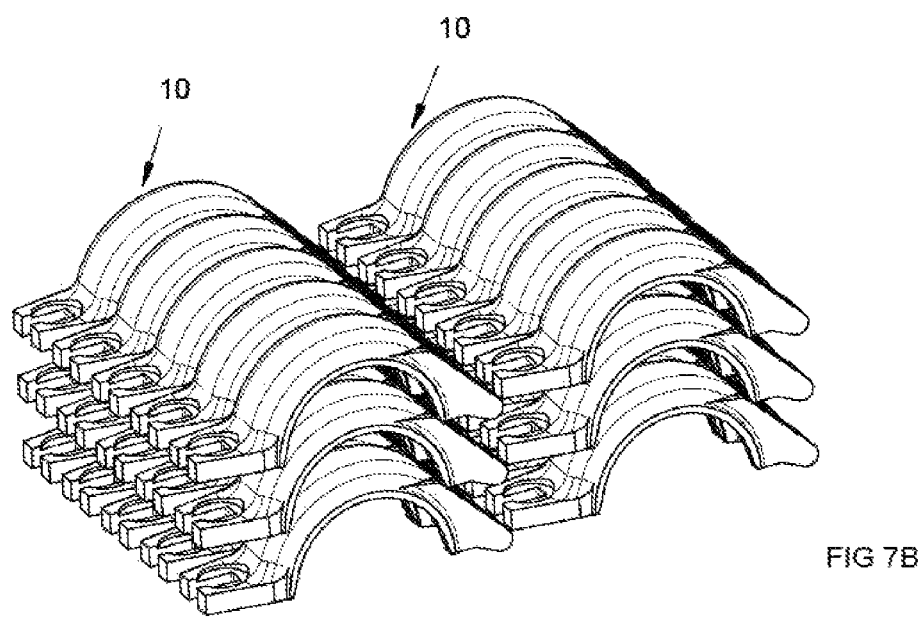
Figure 8:
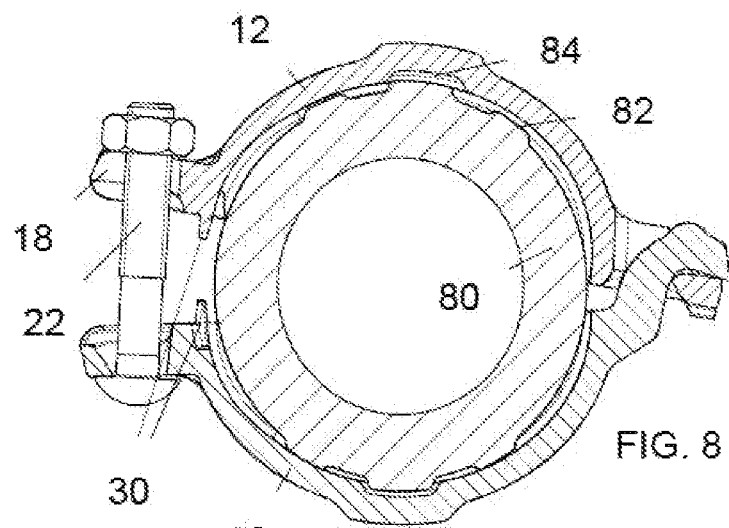
FIGS. 8, 9 and 10A-10B, are simplified illustrations of a seal with improved alignment structure, in accordance with a non-limiting embodiment of the invention, FIG. 8 being a sectional illustration along lines 8-8 in FIG. 9 and FIG. 9 being a sectional illustration along lines 9-9 in FIG. 10A.
Figure 9:
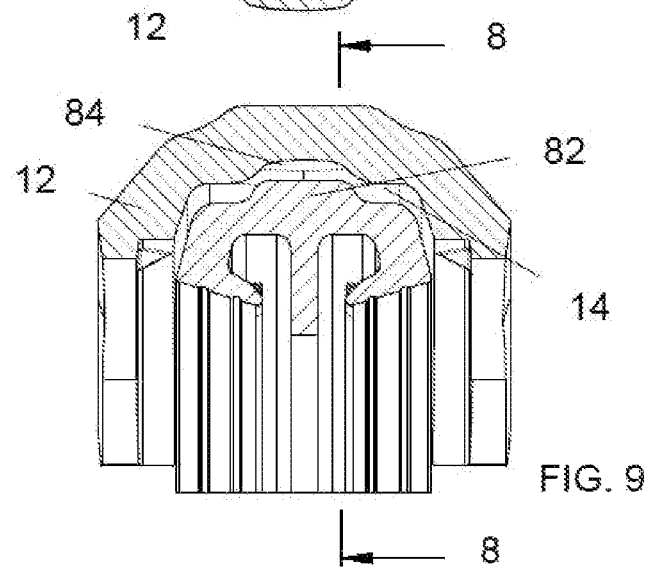
Figures 10A, 10B:
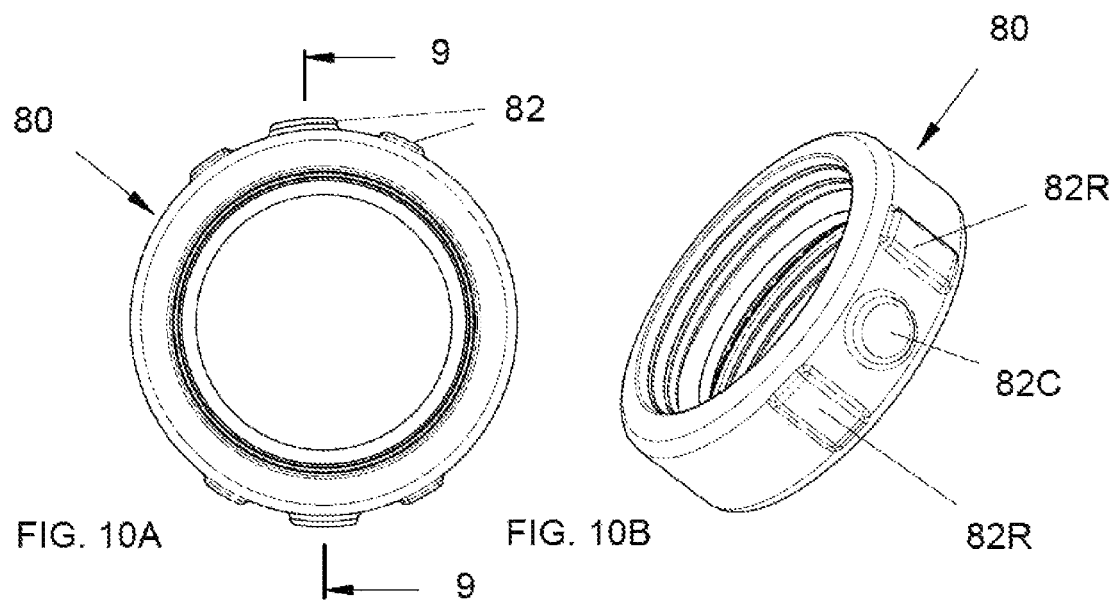

Reference is now made to FIGS. 7A and 7B, which illustrate stacking of coupling segments 10 together to reduce space for storage and shipping. Of course, the fact that they are identical also reduces manufacturing costs.

Reference is now made to FIGS. 8, 9 and 10A-10B, which illustrate another version of the seal, referred to as seal 80, with alignment structure, in accordance with a non-limiting embodiment of the invention. Seal 80 may include one or more radial protrusions 82 which are received in one or more recesses 84 formed in the inner annular channel 14 of the curved portion 12 of coupling segment 10. Radial protrusion 82 may be circular (marked as 82C in FIG. 10B) or rectangular (marked as 82R in FIG. 10B) or other shapes. The recess 84 is shaped according to the shape of protrusion 82.

The structure of the protrusions 82 may help properly align the seal 80 at the time of installing the pipe coupling on the pipes and may also help prevent the seal 80 from moving off-center from the pipe coupling before tightening the seal. The protrusions may be radially outwards (as shown in solid lines) or radially inwards (as shown in broken lines).

Figure 11A:
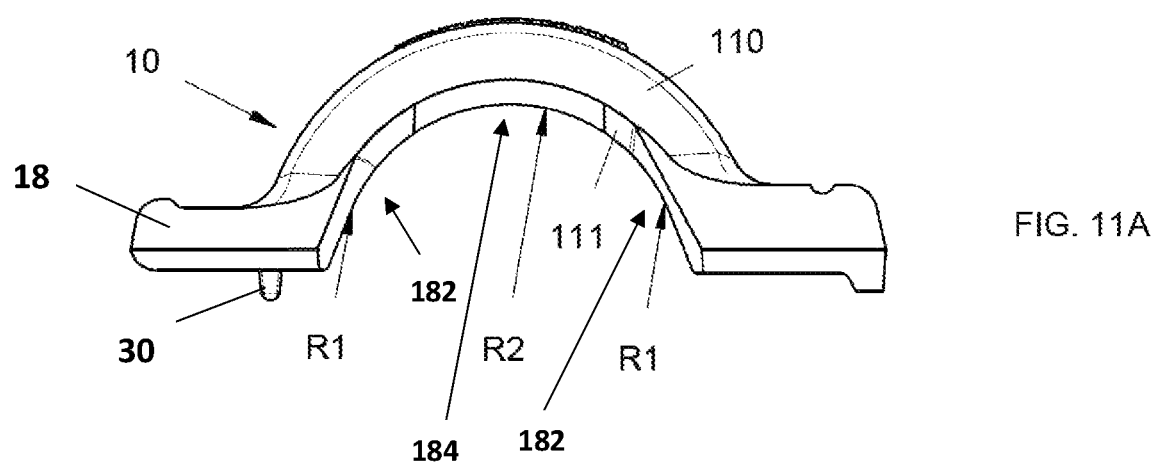
FIGS. 11A, 11B and 11C are simplified illustrations of segments of a pipe coupling, in accordance with a non-limiting embodiment of the invention.
Figure 11B:
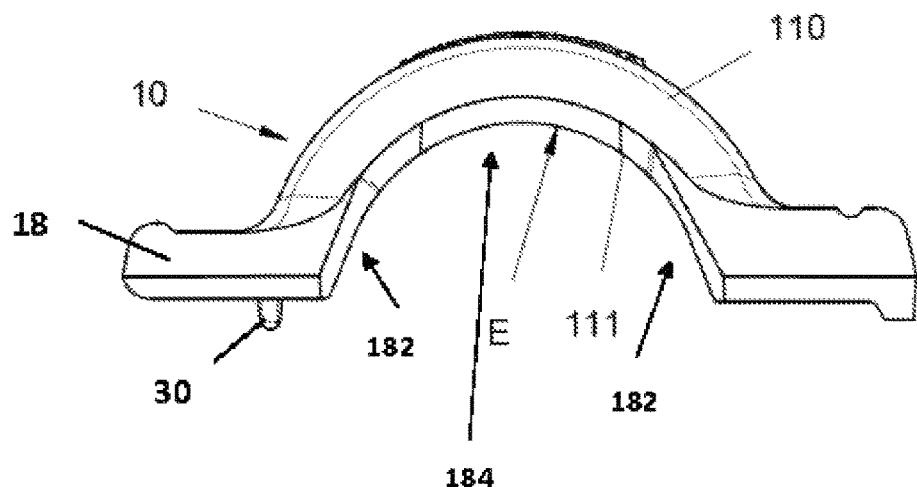
Figure 11C:
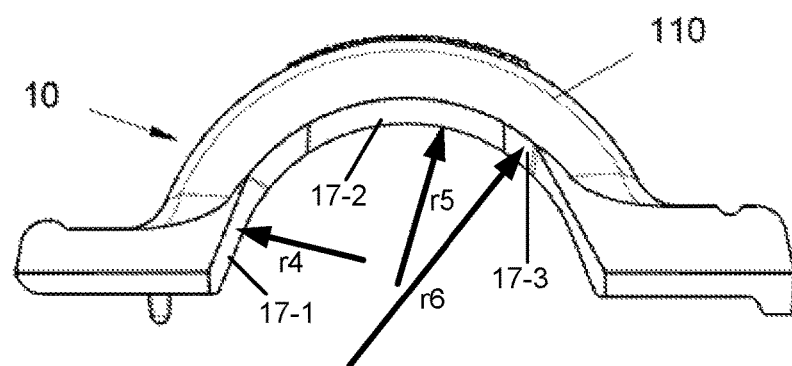

Reference is now to FIGS. 11A-11C, which are schematic of the coupling segments 10 in accordance with some embodiments of the present invention. In some embodiments, segment 10 includes a curved portion 110 with an inner annular recess 111 (for receiving therein seal 16, not shown), which is not semi-circular, but instead may be defined by two different radii. In FIG. 11A, the central inner contour of recess 111 may have a first radius, whereas left and right off-center inner contours of recess 111 may have a second radius different from the first radius. This defines an oval shape.

In FIG. 11B, inner annular recess 111 is defined by an ellipse E. Other non-circular shapes are also in the scope of the invention, facilitating proper alignment of the seal at the time of installing the pipe coupling on the pipes and prevent off-center movement.

Reference is still made to FIGS. 11A-11C. As described elsewhere herein, coupling segments 10 are deformed by tightening fastening lugs 18, which draw segments 10 toward each other and cause arcuate lateral rim surfaces 17 to engage the outer surfaces of pipe elements 34. In some embodiments, each one of the two arcuate lateral rim surfaces 17 of segment 10, comprises two end portions 182, each end portion 182 has an end portion radius of curvature R1. Additionally, each one of the two arcuate lateral rim surfaces 17 of segment 10, comprises a middle portion 184 disposed between two end portions 182 and has a middle portion radius of curvature R2. End portion radius of curvature R1 is different from the middle portion radius of curvature R2. Typically, R2 is greater than R1, due to converging and a narrowing of arcuate lateral rim surfaces 17, thereby facilitating enhanced engagement of arcuate lateral rim surfaces 17 with pipe elements 34.

For some embodiments, the radius of curvature of the each one of the end portions 182 is the same.

For some embodiments, multiple portions of rim 17 comprise different radii. In some embodiments, the different radii of rim 17 are not concentric. In an exemplary embodiment depicted in FIG. 11C, rim 17 comprises three portions: a first edge portion 17-1 having a radius (r4), a central portion 17-2 having a radius (r5) and a second edge portion 17-3 having a radius (r63). As shown in FIG. 11C, radii (r4), (r5) and (r6) are derived from corresponding non-concentric circles.

Reference is now made to FIGS. 12A-12E, which illustrate another optional feature of the invention. For some embodiments, segment 10 comprises at least one elevated protrusion 120 protruding from inner surface 14 of the curved portion 12. For example, elevated protrusion 120 is shaped to define a pillow, a pad or a radially inward bump. Protrusion 120 may assume any shape, e.g., elevated protrusion 120 may be rectangular, square or circular. Typically, elevated protrusion 120 extends from the inner surface 14 and is formed of the same metallic material that forms curved portion 12 and inner surface 14.

Figure 12A:
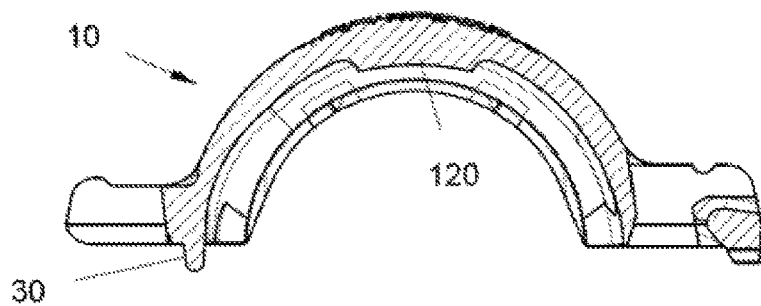
FIGS. 12A and 12B are simplified sectional illustrations of a segment of a pipe coupling, in accordance with a non-limiting embodiment of the invention, in which the segment includes an elevated protrusion protruding from the inner surface of the curved portion (a radially-inward facing bump)
Figure 12B:
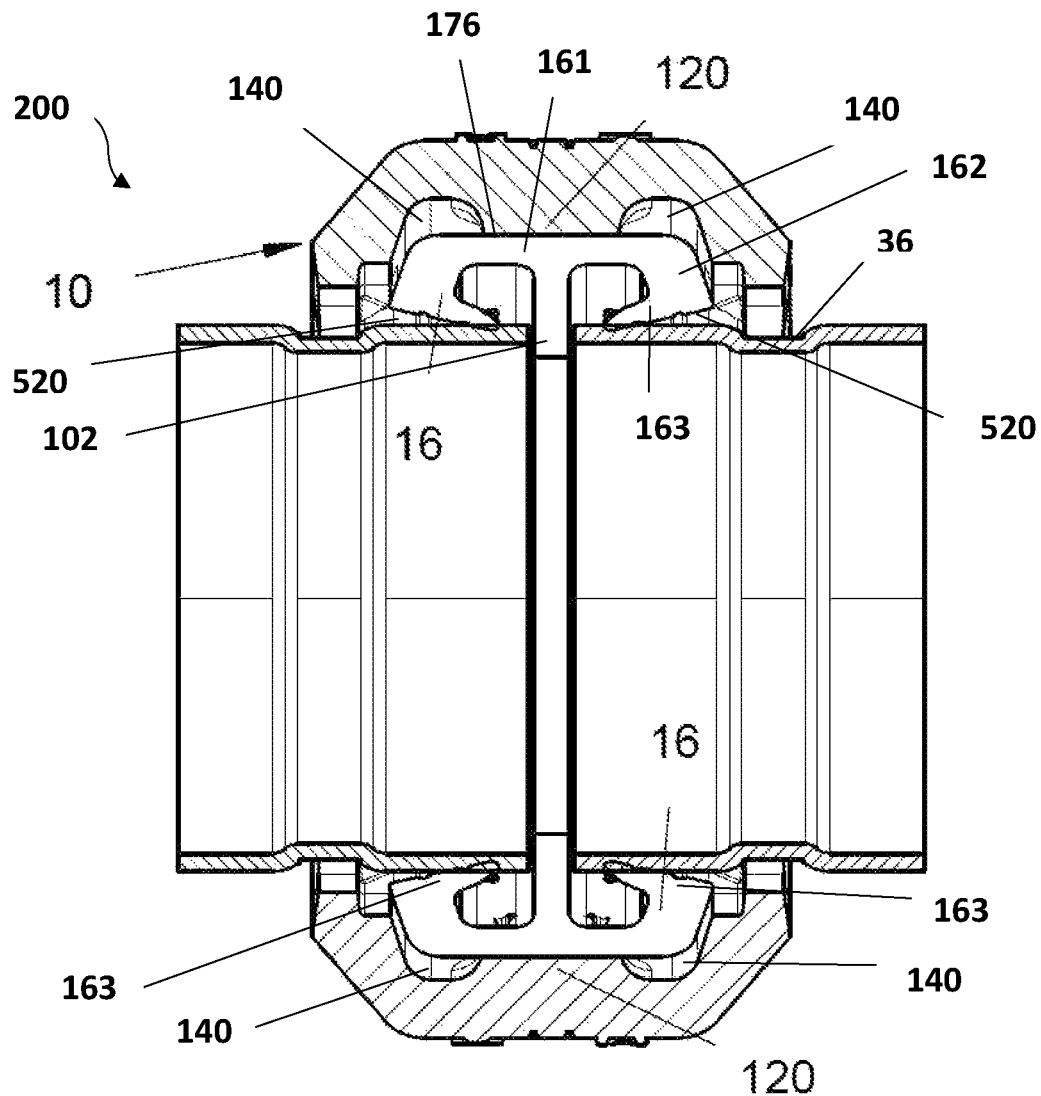
Figure 12C:
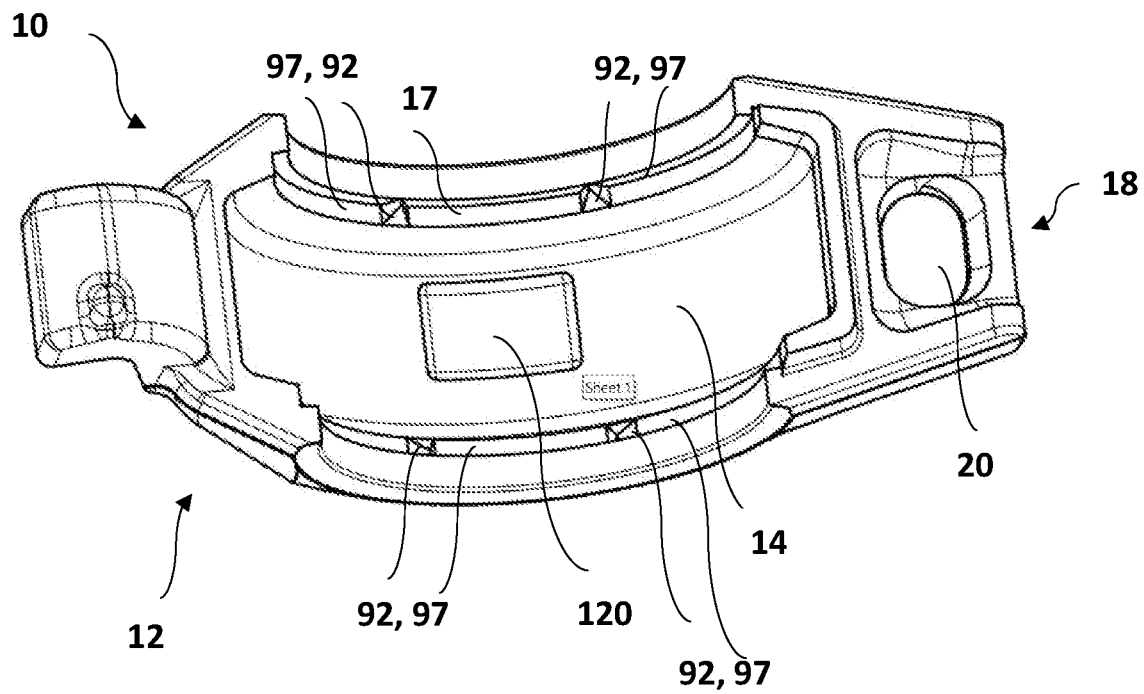
FIGS. 12C, 12D and 12E are additional schematic illustrations of the coupling segment, in which the segment includes an elevated protrusion protruding from the inner surface of the curved portion, in accordance with a non-limiting embodiment of the invention.
Figure 12D:
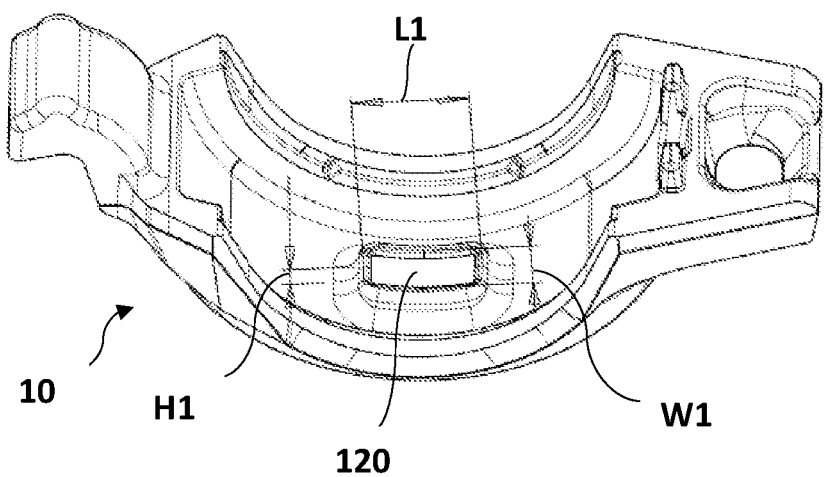
Figure 12E:
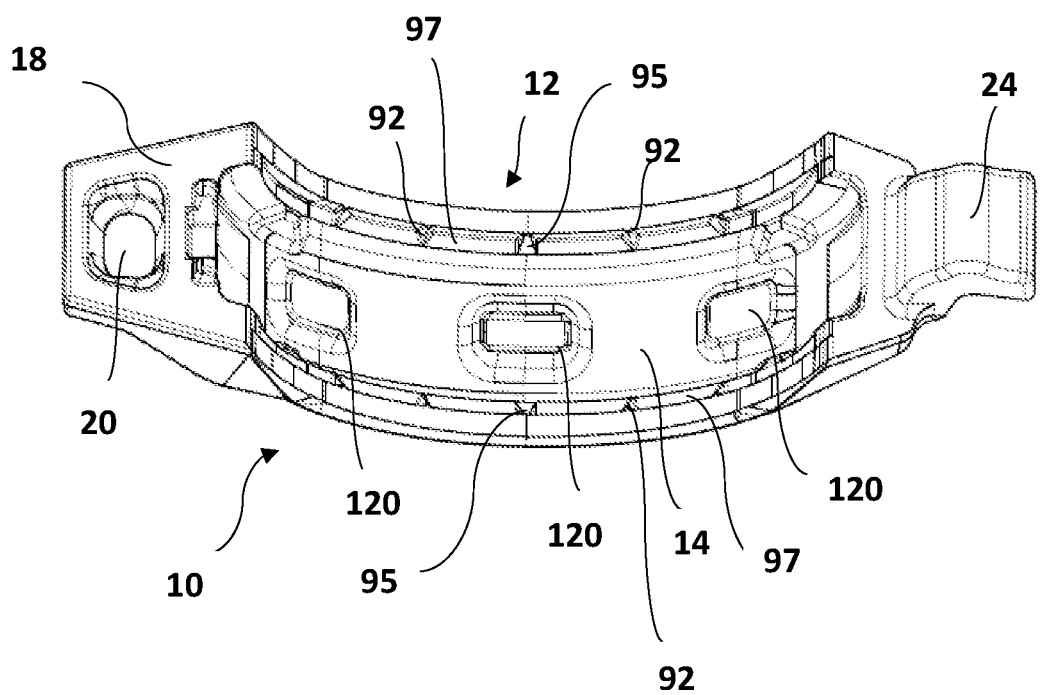

For some embodiments, when assembling segments 10 on a pipe, before even tightening any fasteners, elevated protrusion 120 initially imparts a radially inward force on seal 16, which locally depresses outer surface 176 of the seal at the point of contact with elevated protrusion 120, bringing sides of seal 16 (e.g., portions 163) to bulge out, e.g., flare out, to the left and right of the point of contact with elevated protrusion 120. This makes it easier to place the seal 16 around the pipe and also holds and maintains the seal in its correct place. Additionally, or alternatively, when tightening segments 10 together, portions 163 of seal 16 continue to flare downwards and outward towards groove 36 to seal area 520 (FIG. 12B).

More specifically, elevated protrusion 120 is configured to (i) contact an outer surface 176 (also shown in FIG. 3C) of the seal 16 when seal 16 is disposed in the inner surface annular channel 14, (ii) distance inner surface 14 of curved portion 12 from the outer surface of the seal 16 such that a gap 140 is formed between the outer surface of the seal 16 that is not in contact with elevated protrusion 120 and inner surface 14 of curved portion 12; and (iii) apply non-uniform pressure along the outer surface (outer circumference) of seal 16. Typically, elevated protrusion 120 applies the non-uniform pressure by applying localized pressure to a portion of seal 16 in contact with elevated protrusion 120.

In some embodiments, elevated protrusion 120 increases a point of friction between seal 16 and the first pipe element to reduce movement of the first pipe element when the first pipe element is disposed inside the seal prior to and/or during insertion of the second pipe element into the seal. This typically facilitates assembling of pipe coupling assembly 200 together with pipe elements 34. For example, following insertion of a first pipe element 34 into seal 16 (seal 16 maintaining two opposing segments 10 in a spaced-apart relation), pipe element 34 is stabilized and securely disposed inside a portion of seal 16 due to the localized pressure applied inward by elevated protrusion 120, allowing the installer to proceed with insertion of the second pipe element 34 into the opposite side of seal 16 generally without the need to manually hold and stabilize the first pipe element.

Additionally, or alternatively, elevated protrusion 120 applies pressure to locally deform seal 16 into gap 140 when the fastening lug members are drawn towards each other.

In some embodiments, segment 10 comprises 1-5, e.g., 3, elevated protrusions 120.

In some embodiments, elevated protrusion 120 has a height H1 of 2-6 mm, e.g., 4 mm.

In some embodiments, elevated protrusion 120 has a length L1 of 10-30 mm, e.g., 15-20 mm, e.g., 19 mm.

In some embodiments, elevated protrusion 120 has a width W1 of 5-15 mm, e.g., 5-10 mm, e.g., 9 mm.

In other embodiments, elevated protrusion 120 extends along a majority of the inner surface channel 14.

Reference is again made to FIGS. 12C and 12E. In some embodiments, at least one guiding surface 97 formed on a portion of at least one of the arcuate lateral rim surfaces 17 and configured to guide seal 16 towards inner surface 14 of curved portion 12. For some embodiments, guiding surface 97 comprises one or more projecting elements 95. Typically, guiding surface 97 is configured to inhibit trapping of seal 16 by arcuate lateral rim 17 when fastening lug members 18 are drawn toward each other. In some embodiments, guiding surface 97 further comprises at least one grip-facilitating serrated protrusion 92 configured penetrate (e.g., get lodged in) seal 16 to press the seal against pipe elements 34.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A pipe coupling assembly for coupling pipe elements in an end-to-end relationship, the pipe coupling assembly comprising:
   first and second coupling segments, each coupling segment comprising:
   a curved portion having a first end and a second end, and an inner surface extending between the first and second ends, the inner surface defining a channel shaped and sized to receive a portion of an annular seal therein;
   a fastening lug member extending radially outward from the second end of the curved portion, the fastening lug members of the first and second coupling segments being configured to be drawn towards each other to close said first and second coupling segments around said pipe elements; and
   at least one elevated protrusion protruding from the inner surface of the curved portion and configured to impart a radially inward force on said annular seal,
   wherein the curved portion comprises two lateral gaps formed between the outer surface and the seal, the two lateral gaps are not in contact with the at least one elevated protrusion,
   wherein the at least one elevated protrusion applies pressure to locally deform the seal into lateral gaps, and
   wherein the seal comprises a resilient ring shaped to define an outer annular portion from which radially inwards extend left and right lateral portions, and wherein left and right inner annular portions extend axially inwards from the left and right lateral portions, respectively, and wherein the seal further comprises a plurality of projecting tabs extending from the outer annular portion and positioned in a spaced apart relation to one another around a circumference of the outer annular portion, the plurality of projecting tabs being disposed between the left and right inner annular portions and projecting radially inwardly.

2. The pipe coupling assembly according to claim 1, wherein the seal is configured for use with end portions of first and second pipe elements; and wherein the at least one elevated protrusion is configured to increase a point of friction between the seal and the first pipe element to reduce movement of the first pipe element when the first pipe element is disposed in the seal prior to insertion of the second pipe element into the seal.

3. The pipe coupling assembly according to claim 1, wherein the at least one elevated protrusion comprises 1-3 elevated protrusions.

\* \* \* \* \*